United States Patent [19]
Ozeki et al.

[11] Patent Number: 5,872,641
[45] Date of Patent: Feb. 16, 1999

[54] METHOD AND APPARATUS FOR TRANSMISSION OF FACSIMILE MESSAGES

[75] Inventors: Shinichiro Ozeki; Mutsuo Ogawa, both of Tokyo, Japan

[73] Assignee: Ricoh Company, Ltd., Tokyo, Japan

[21] Appl. No.: 924,956

[22] Filed: Sep. 8, 1997

Related U.S. Application Data

[63] Continuation of Ser. No. 579,778, Dec. 28, 1995, abandoned.

[30] Foreign Application Priority Data

Dec. 28, 1994 [JP] Japan .................................. 6-326677

[51] Int. Cl.⁶ ...................................................... H04N 1/00
[52] U.S. Cl. ............................ 358/434; 358/436; 358/438; 358/405
[58] Field of Search ..................................... 358/436, 434, 358/435, 438, 439, 440, 468, 400, 403, 401, 405, 402; H04N 1/00

[56] References Cited

U.S. PATENT DOCUMENTS

| | | |
|---|---|---|
| 4,996,707 | 2/1991 | O'Malley et al. ....................... 358/402 |
| 5,216,517 | 6/1993 | Kinoshita ................................ 358/400 |
| 5,216,706 | 6/1993 | Nakajima ................................ 379/100 |
| 5,270,834 | 12/1993 | Kuwahara ............................... 358/440 |
| 5,283,665 | 2/1994 | Ogata ...................................... 358/434 |
| 5,287,202 | 2/1994 | Kumarappan ........................... 358/440 |
| 5,459,454 | 10/1995 | Nakano ................................... 358/434 |
| 5,544,229 | 8/1996 | Creswell et al. .......................... 379/67 |
| 5,559,611 | 9/1996 | Bloomfield ............................. 358/407 |
| 5,590,339 | 12/1996 | Chang ..................................... 395/750 |
| 5,621,539 | 4/1997 | Brown et al. ........................... 358/400 |

*Primary Examiner*—Edward L. Coles
*Assistant Examiner*—Madeleine Av Nguyen
*Attorney, Agent, or Firm*—Dickstein Shapiro Morin & Oshinsky LLP

[57] ABSTRACT

A method and apparatus for facsimile communication uses subaddress messages sent from a sending facsimile terminal to control how a facsimile image transmission is to be handled, e.g., routed and/or translated, by a receiving facsimile terminal. The invention may be employed through the use of an adapter which is designed to work with existing facsimile terminals which are incapable of generating subaddress messages. The invention, when employed with 10-key facsimile machines which cannot generate by the keys thereof proper subaddress delimiting symbols, automatically transforms non-permitted transmission symbols generated by the key to permitted transmission symbols.

79 Claims, 7 Drawing Sheets

TSI=39303131303232363431382B3433323120202020

Sending Terminal Identification=81462201109
Subaddress=1234
Identifier=*(Actually, this is transmitted as "+".)

METHOD AND APPARATUS FOR TRANSMISSION OF FACSIMILE MESSAGES

This application is a continuation of application Ser. No. 08/579,778 filed Dec. 28, 1995, now abandoned.

FIELD OF THE INVENTION

The present invention relates to a communication method and apparatus for transmitting a facsimile message from a sending facsimile terminal to a receiving facsimile device. It more particularly relates to a communication method and apparatus which employs the ITU-T Recommendation T. 30, and which adds to the sending terminal identification (TSI) message a subaddress which is used to instruct the receiving facsimile terminal on how it should process or route a received facsimile transmission.

BACKGROUND OF THE INVENTION

A method of transferring facsimile data which is memory stored in a receiving facsimile terminal and then transmitted to another facsimile terminal, is described in Japanese Patent Application Publication HEI 2-260940. A method of selecting a facsimile service function is described in Japanese Patent Application Publication HEI 3-108949.

In the former facsimile transmission method, subaddress information is sent from a sending facsimile terminal and received by a facsimile terminal. A file number is read from a file number memory at the receiving facsimile terminal which is associated with the subaddress information, and then the received information is stored in a corresponding file within an image data memory with the associated file number. After the received information is stored into the file, a call is made to a designation terminal which has been registered at the receiving machine in correspondence with that file number, and then the received facsimile information is retransmitted to that designated terminal.

In the latter facsimile transmission method, subaddress information is sent from the transmitting facsimile device to designate a service function to be performed by the receiving facsimile device. The extracted subaddress information is compared at the receiving facsimile terminal with a list of previously stored subaddress information and a service function which corresponds to the transmitted subaddress and is to be executed by a communication manager is selected from the list.

The above methods of registering a destination in correspondence to subaddress information beforehand in a system for transferring memory transmitted data to another facsimile terminal, or a method of selecting a service function at a receiving side out from a list based on the subaddress information received, have been employed in a communication method which is based on the ITU-T Recommendation T. 30 protocol. However, the subaddress notification used is effective only between those facsimile machines which can transmit and receive the subaddress, and a terminal which can not transmit a subaddress can not in turn communicate using a subaddress in any one of the foregoing methods.

Also, a TSI (sending terminal identification) in a G3 facsimile machine is what is registered therein at a time of its installation and the TSI can not be rewritten every time a call is made from the machine. Therefore, it has been necessary in such terminals to designate a call number of a called party after first resetting the TSI in accordance with a desired subaddress message.

Still further, when a sending terminal identification number and a subaddress are to be set in a facsimile terminal capable of handling subaddress information, the symbols "#, *, +, (space)," etc. are conceivable for identifying message boundaries, but under the provisions of the T. 30 recommendations the use of the symbols "#, *" is not allowed. Therefore, there has been a problem that a boundary between a sending terminal number and subaddress can not be created in a facsimile terminal in which input data is entered by a ten key keyboard containing only the symbols (0–9), #, and *.

Still further, in a facsimile server system in which a communication line is connected to the outside world, e.g., the public switched telephone network (PSTN) and terminals which are selected by a subaddress designation are connected locally or inside a facsimile facility containing the server, the only method for a transmission from the outside line to plural terminals on the inside is by assigning a separate subaddress to each one of the terminals for communication. Thus, when a facsimile transmission is to be received by plural terminals, it must be retransmitted for each.

Still further, a designation of services by using a subaddress has been limited to a method of transmitting to the destinations which have been registered in correspondence to a subaddress, and a method of selecting a service function or other special service for a receiving facsimile terminal using a subaddress has not been available.

The present invention has been designed to overcome the foregoing problems.

Thus, a first object of the present invention is to provide a method and apparatus for facsimile communication in which services can be provided by using subaddress information without restriction imposed by the type of equipment used at a transmitting side.

A second object of the present invention is to provide a method and apparatus for facsimile communication which can designate a subaddress within the TSI (sending terminal identification) at the same time as a designation of a call number of a receiving facsimile terminal is made.

A third object of the present invention is to provide a method and apparatus for facsimile communication which can perform a proper subaddress notification, using the ITU-T recommendation T. 30 even with facsimile terminals which support only a ten-key keyboard.

A fourth object of the present invention is to provide a method and apparatus for facsimile communication in which a transmission can be made with a subaddress being added, even with an existing facsimile terminal which does not have a subaddress capability.

A fifth object of the present invention is to provide a method and apparatus for facsimile communication in which a broadcasting is possible using a single facsimile transmission, even when a broadcast is to be made to plural terminals connected to a facsimile server from an outside line.

A sixth object of the present invention is to provide a method and apparatus for facsimile communication in which a translation of a message into various languages, or other transformation functions, at a receiving facsimile terminal can be designated by designating a subaddress from outside.

In one aspect of the invention the foregoing objectives are achieved by providing a method of facsimile communication in which a first facsimile terminal transmits to a second facsimile terminal image information and designates the image information to be provided as a service, e.g., a broadcast service. The second terminal, in turn, stores that image information and provides the communication service designated in the subaddress to one or more terminals to which it is connected. When the first facsimile terminal makes its transmission, a subaddress composed of a number of digits is added to a sending terminal identification (TSI) message within the transmission procedure, so that the second facsimile terminal detects the subaddress added to the sending terminal identification and performs the service, e.g., broadcast, based on the content of the subaddress message.

In another aspect, the present invention provides a facsimile communication system having a first facsimile terminal transmitting image information and designating it through a subaddress message to be provided as a service, and a second facsimile machine storing that image information and performing a designated service to one or more terminals connected thereto in accordance with the content of the subaddress message. The first and second facsimile machines have registering means for a number of a called party and function to rewrite a subaddress within the sending terminal identification (TSI) together with the number of the other party at a time of call-out of the image for transmission, or at time of memory registration of the image for later transmission.

In another aspect, the invention further employs a subaddress registering means which registers the subaddress within the TSI with the TSI and subaddress being entered by a ten key keyboard (0–9) and with use of the symbols (#, *) to distinguish the remainder of the TSI from the subaddress, and at a time of call-out of a called number and an image for transmission, or during a memory registration of the image for later transmission, the TSI is sent out after first converting the '#' or '*' symbols to a '+' or other permitted symbol.

In another aspect, the present invention provides a facsimile adapter device which can be connected to an analog communication network such as the conventional PSTN and to a facsimile terminal (local facsimile) to couple them together. The adapter includes means for recognizing DTMF (dial tone and multi-frequency) signals within a transmission procedure and storing the same; and transmitting means for transmitting the DTMF signals. The adapter is operated so that when the local facsimile seeks to make a subaddress transmission, a DTMF is sent out and a connection is made with a called communication terminal at the called party, and at a time of transmission of the TSI from the local facsimile terminal, the TSI is first fetched and held by the adapter, and the subaddress is added to the TSI by the adapter, and then the TSI by the adapter is transmitted.

In another aspect, the present invention provides a facsimile server which is connected to a communication line as its external line and can select an internal terminal by designating a subaddress or its internal line. This facsimile server includes a means for registering subaddresses for the terminals of the internal line, the subaddresses designating a broadcasting, and transmitting means for making a broadcast communication to each terminal registered in the subaddress registering means when a designation with subaddress is received from a sending facsimile terminal through the external line.

In yet another aspect, the present invention provides a communication system connected to a communication line which transmits and receives a subaddress, and includes a processing means for transforming received data from one form to another, e.g., language translation, graphic to text, etc., control means for receiving data transmitted by another facsimile machine which has requested the transformation service, and a subaddress which designates the transformation service to be performed, and for directing that processing means to transform the data based on the designation of the subaddress; and transmitting means for transmitting the data transformed by the processing means to the facsimile machine which made the request.

In the present invention, since an address notification is made within the TSI (sending terminal identification), services using the subaddress can be obtained without limiting the types of equipment which can be used at the transmitting side by supporting a subaddress receiving function within the TSI at a receiving side. Also, a subaddress designation within the TSI is made at the same time ad a designation of the number of the called party and the TSI can be convenient rewritten every time a call-out is made. Also, even for facsimile terminals which support a ten-key keyboard only, a subaddress can still be transmitted by using a symbol to distinguish the TSI from the subaddress Also, even in an existing facsimile terminal which does not support a subaddress, a subaddress can be added to the TSI and transmitted by connecting the existing facsimile terminal to a facsimile adapter. Further, a broadcast can be made to one or a plurality of terminals connected to a facsimile server with one transmission thereto by effecting a subaddress designation to the facsimile server from the outside.

Further, a transformation of the data can be designated by designating a transformation service from the outside with a subaddress.

These and other objects, advantages and features of the invention will be more readily understood from the following detailed description of the invention which is provided in conjunction with the accompanying drawings.

BRIEF DESCRIPTION OF THE DRAWINGS

FIG. 6 is a diagram showing a typical TSI message employed in the present invention.

DETAILED DESCRIPTION OF THE INVENTION

Now, an embodiment of the present invention will be explained in connection with FIGS. 1–9 of the drawings.

Figure 1:
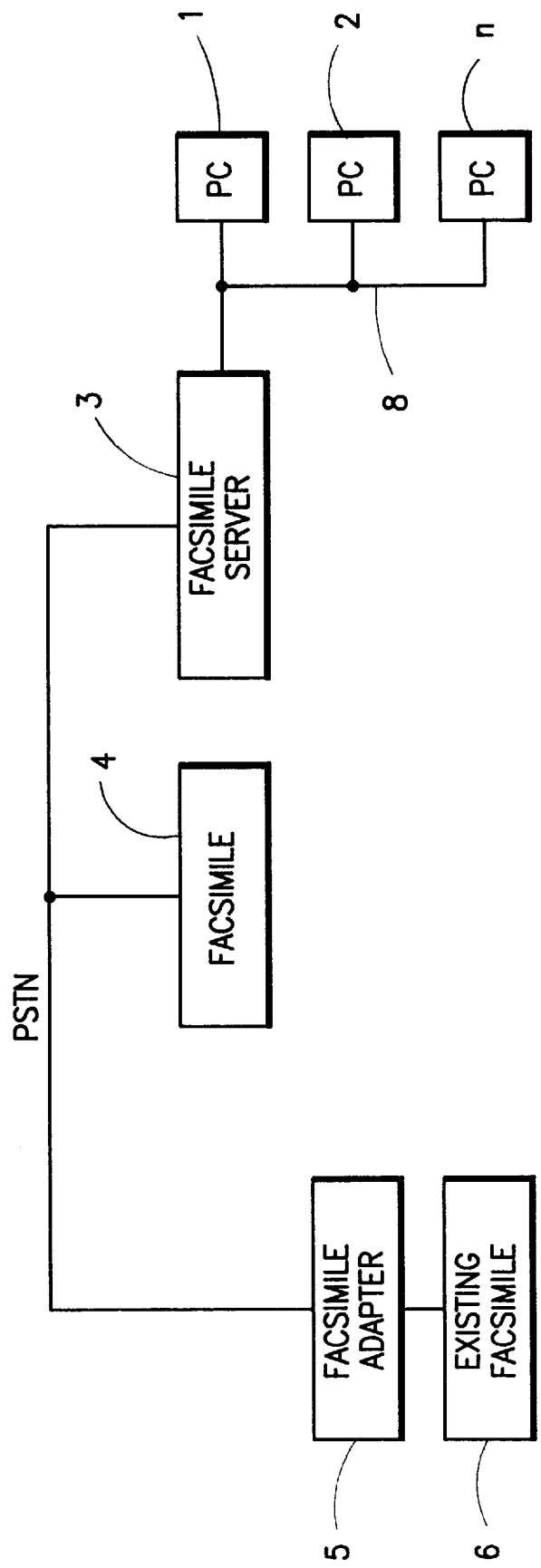
FIG. 1 is a block diagram of a network to which the present invention is directed.

FIG. 1 shows a network to which the present invention is applied. The network is shown as a public switched telephone network (PSTN). Communication is shown as occurring between the PSTN and a facsimile machine 4, an existing facsimile machine 6 to which a facsimile adapter 5 is added, or a facsimile server 3 connected to LAN 8. What are shown as 1~n are personal computers (PCs) which are connected by inside lines to server 3. For purposes of this application, any device which is capable of sending or receiving a facsimile transmission is called a facsimile terminal. FIG. 1 thus shows three different arrangements by which a facsimile transmission may be received over a communication network, such as the PSTN.

As noted, the present invention uses a subaddress which is added to the TSI of a sending facsimile terminal to control operations, such as various services, or broadcasting at a receiving facsimile terminal.

When the facsimile server 3, for example, receives such a subaddress designation, if this designation is for a broadcast, a transmission of received facsimile information is made to those PCs of the group 1~n, designated for broadcast in a pervious registration at the facsimile server 3. Also, if this designation is a request for a special service, such as translation service, the subaddress message in which image information and translation language are designated is transmitted to the facsimile terminal which is designated to perform the service, e.g., PC 1. The PC 1 reads an original and performs a translation based on the read original, or information which is character transmitted, and returns the translation results to a number of a sending terminal designated by the TSI. Also, when it is not a broadcast, nor a translation, image information received by PC 1 is transmitted to a PC designated by a received subaddress (for example, PC 2).

Figure 2:
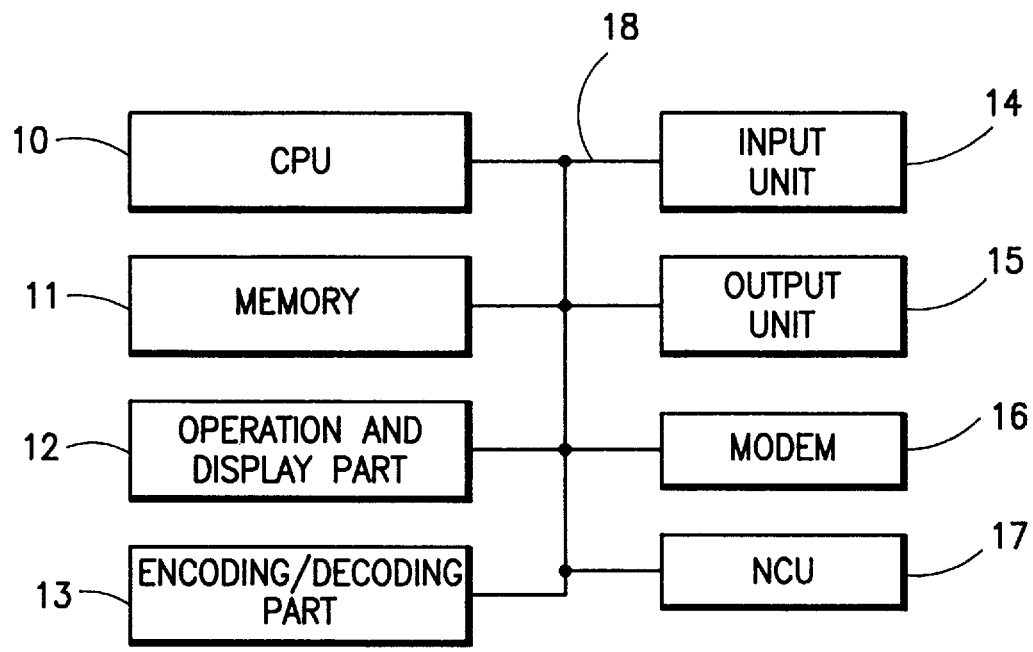
FIG. 2 is a block diagram of the facsimile machine 4 shown in FIG. 1.

FIG. 2 shows the control system for a stand-alone facsimile machine 4 which employs the invention, The facsimile machine 4 includes a control CPU 10, a memory 11 for storing a program of the CPU 10, as well as image information and various parameters, an operation and display part 12, which makes a setting of parameters and operations at a time of transmission of an original image or data, an encoding and decoding part 13 to effect compression and expansion of image information, an input unit 14, such as a scanner, which captures image information, an output unit 15, such as a printer and a display device, etc., for outputting the image information, a modem 16 for modulating and demodulating data, and an NCU (line connection device) 17 for a connection to the PSTN line. These components are connected together through a system bus 18.

Facsimile machine 4 is capable of generating and receiving subaddress messages. During a transmission, CPU 10 checks a number of a party to be called and decides whether it can receive a subaddress or not at a time of transmission of information thereto, and if the called party can receive a subaddress, CPU 10, makes a call with the other party's number by memorizing the subaddress, and transmits the TSI to the called party to which the subaddress is added. Also when the CPU 10 receives facsimile information from another machine it checks whether a subaddress is added thereto or not, and if one is added, the CPU decides whether it is a subaddress designating a broadcast, a subaddress designating a translation or other data transformation service, or a subaddress for transferring the information to a terminal or terminals which have been registered. Here, when a subaddress for transfer to a registered terminal is received, it is necessary to have at least one other facsimile machine addedly connected to facsimile machine 4 inside of the system.

While a rewriting of the TSI can not be made every time a call is made from a facsimile terminal based on the ITU-T Recommendation T. 30, a means for registering the number of the called party and a subaddress within the TSI is provided within the memory 11 in the present invention, thus the subaddress within the TSI can be rewritten together with the number of the called party at a time of making a call, or at a time of a memory registration of the called party's number.

Figure 3:
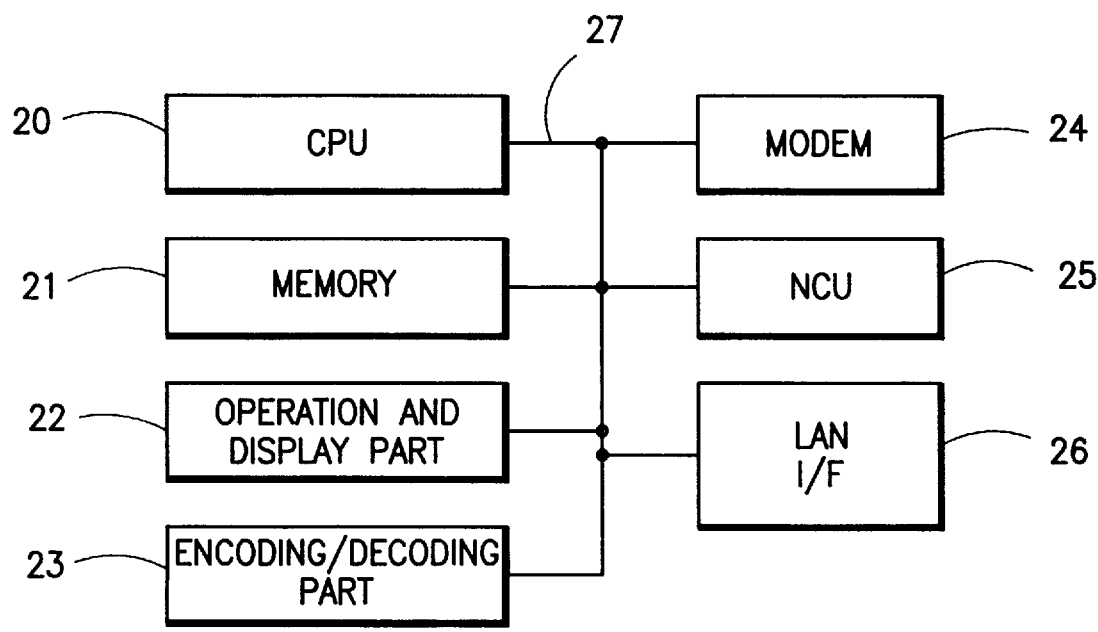
FIG. 3 is a block diagram of the facsimile server 3 shown in FIG. 1.

FIG. 3 is a block diagram of the control system fox facsimile server 3 of FIG. 1. The control system includes a CPU 20, a memory 21 for storing a program of the CPU 20 as well as various parameters, an operation and display part 22 for setting parameters and the like, an encoding and decoding part 23 for compression and expansion of image information, a modem 24 for modulation and demodulation, an NCU 25 (network connection device) for connection to the outside line, and a LAN interface 26 for a connection to the LAN 8. These components are connected to a system bus 27.

The facsimile server 3 is connected to plural PCs 1~n which are connected to the LAN 8. The PC terminals which are to receive a broadcast are registered beforehand as are terminals to which a broadcast is to be made. Further, a PC terminal designated for performing a translation, or other service, is also registered. For example, a prior registration may be made respectively for PC1~n as terminals for a broadcast message, P1 as a terminal for performing a translation service, and P2~Pn as terminals for which a transfer is to be designated.

Figure 4:
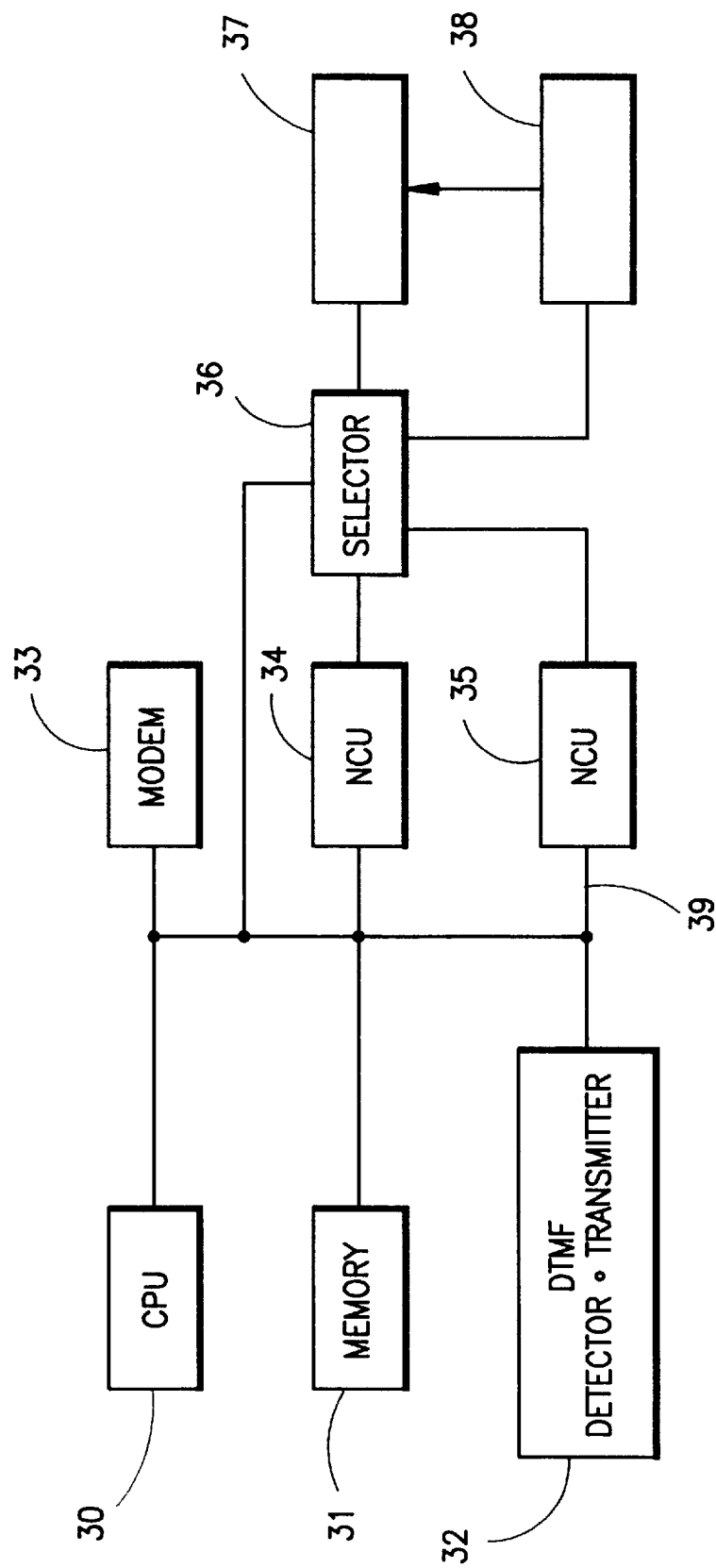
FIG. 4 is a block diagram of the facsimile adapter 5 shown in FIG. 1.

FIG. 4 shows the block diagram for the control system of the facsimile adapter 5 shown in FIG. 1. FIG. 4 shows a CPU 30 for controlling the facsimile adapter 5, a memory 31 for storing a program of the CPU 30, as well as image information and various parameters, a DTMF detector/transmitter 32 for detecting and transmitting DT (dial tone) and MF (multi-frequency) signals a modem 33 for modulating and demodulating data, two NCUs 35, 35 (network connection units) for connection to the outside line, a selector or a switching unit 36 to change over connections among a connector 37, connector 38, which are connected with the PSTN and NCU 34 and NCU 35.

In a default condition which has been set beforehand without making an initialization, the connector 37 is connected to the NCU 34 and the connector 38 is connected to NCU 35 respectively. All elements are, except for the connectors 37, 38, internally connected through a system bus 39. Signals are not processed in the facsimile adapter 5, except for a DTMF signal, a subaddress and a TSI.

The facsimile adapter 5, when called from a local facsimile 6 (an existing facsimile terminal) having a desire to make a subaddress call, makes a call with the called party's number, without the subaddress, and when the TSI from the local facsimile is recognized, it generates the TSI, and adds a "+" symbol separator and the subaddress and then transmits the same.

Figure 5:
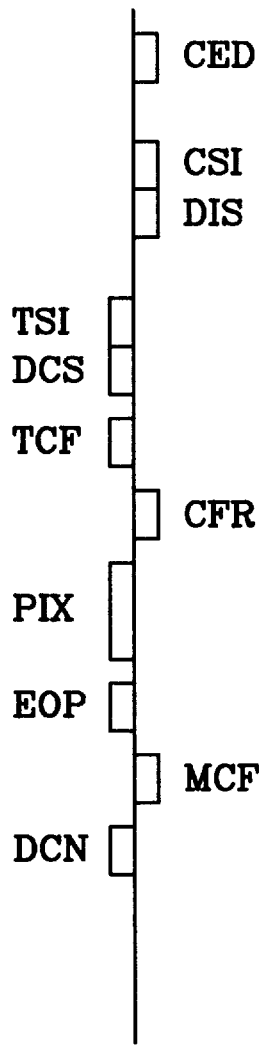
FIG. 5 is a sequence chart to show a protocol of a G3 facsimile transmission according to the ITU-T Recommendation T.30.

FIG. 5 shows the sequence protocol of a G3 facsimile transmission according to the ITU-T Recommendation T. 30. Indicated signals on the right of the vertical line are sent from the receiving station, those on the left are sent from a sending station during transmission. A receiving side first transmits, following a CED, Recognition of a called station), a CSI Identification of a called party) showing a called terminal identifier, and a DIS (identification of function) showing the capability of the terminal at the receiving side Following this, the sending side terminal transmits a TSI (transmitting terminal identification) which is a transmitting terminal identifier, and a DCS (mode setting instructions ), then transmits a TCF (training check) for effecting training of the receiving terminal. If the receiving side can recognize the same, it returns a CFR (confirmation of preparedness for receiving). After that, PIX (image information) is transmitted from the sending side. And when a communication is completed, an EOP (end of procedure) is transmitted from the sending side. The receiving side receives it and returns an MCF (message acknowledgment). When the transmitting side receives the MCF, it sends out an DCN (release of call) and ends the communication.

In accordance with the invention, the TSI contains an added subaddress and has, for example, a total of 20 digits and comprises a transmitting terminal identifier, the subaddress, and an identifier "+" for separating the two. Actually, as shown in FIG. 6, each digit consists of 2 characters of 20~29, 30~39, thus the 20 digits comprises 40 characters. As the right side constitutes a forward end here, after sending a space (20) first, the "1234" subaddress is sent out in the form "31," "32," "33," "34," then after sending out 2B which represents the "*" symbol a distinguishing identifier, the sending terminal identifier (TSI) "81462201109," again in the form "38," "31" . . . "39," is sent out. Here, since the symbol "*" is not permitted, and it is converted to the symbol "+" before being sent out.

Figure 7:
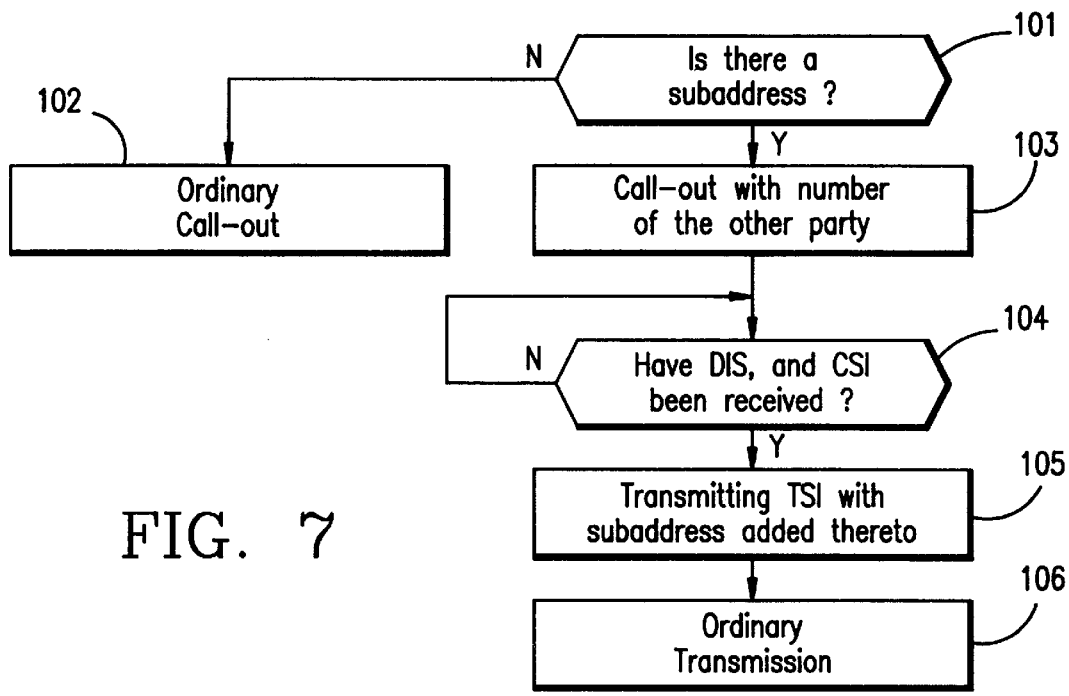
FIG. 7 is a flow chart for the procedure which occurs when a facsimile machine 4 of FIG. 1 makes a facsimile transmission which includes a subaddress designation.

FIG. 7 is a flow chart representing the procedure which occurs when a facsimile terminal such as facsimile machine 4 makes a transmission which includes a subaddress. First, a number of the called party is checked to see whether it has a subaddress added thereto or not (Step 101). If not, the facsimile machine makes an ordinary call-out of the called party's number and a usual facsimile transmission occurs (Step 102). When there is a subaddress associated with the called party, the subaddress is previously stored and then a call-out is made with the number of the called party (Step 103) Next, it is decided whether a CSI (identification of called party) and a DIS (identification of function) have been received or not (Step 104). If they have been received, a TSI (sending terminal identification) with the subaddress added thereto is transmitted (Step 105). When the CSI, DIS have not been received, the process returns to the Step 104 again where the terminal awaits receipt of the DIS and CSI. Here, when the symbols "*" or "#" are used in a break between the TSI (sending terminal identification) and the subaddress, they are converted to a "+" symbol before being sent out. The usual facsimile image transmission will be made in and after the Step (105) at (Step 106).

Figure 8:
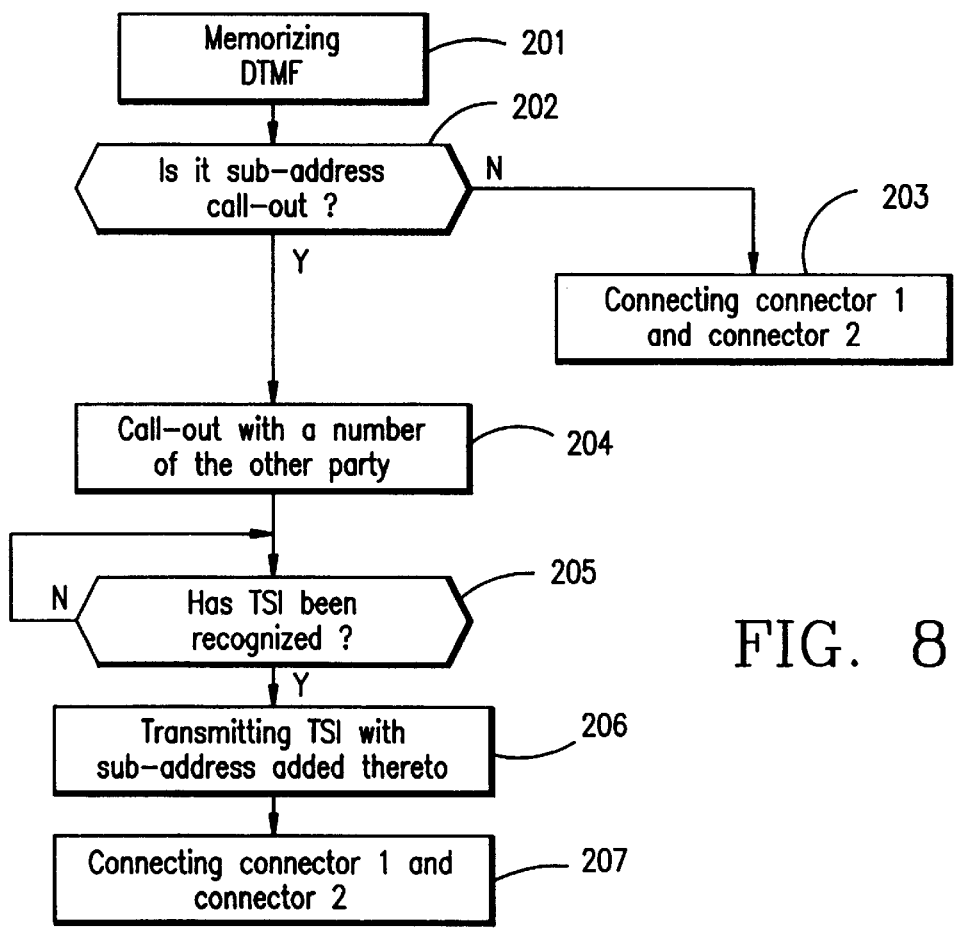
FIG. 8 is a flow chart showing what happens when the facsimile adapter 5 of FIG. 1 detects a call from an existing facsimile machine.

FIG. 8 is a flow chart showing what happens when a facsimile adapter 5 detects a an outbound call from an existing facsimile machine 6. First, a DTMF signal which has been called out from the facsimile machine 6 is stored (Step 201). Next, it is decided whether a call-out with a subaddress using a subaddress identifier e.g., a "* or #" symbol, is being made or not (Step 202). When a subaddress call is not being made, a connector 1 and a connector 2 are connected, then they will not be involved in the communication thereafter (Step 203).

On other hand, when a call-out is to be made with a subaddress added thereto, a call-out is first made on the called number without the subaddress part (Step 204), and it is decided whether the TSI from a local facsimile 6 (existing facsimile) has been recognized or not (Step 205). When the TSI is not recognized, the process returns to the Step 205 again. When the TSI is recognized, instead of transmitting a call as it is to a terminal of the other party, it is first converted to a "transmission identifier (TSI), +, subaddress" and then this is transmitted (Step 206). Next, the connector 1 and the connector 2 are connected and they will not be involved in a communication thereafter (Step 207).

Figure 9:
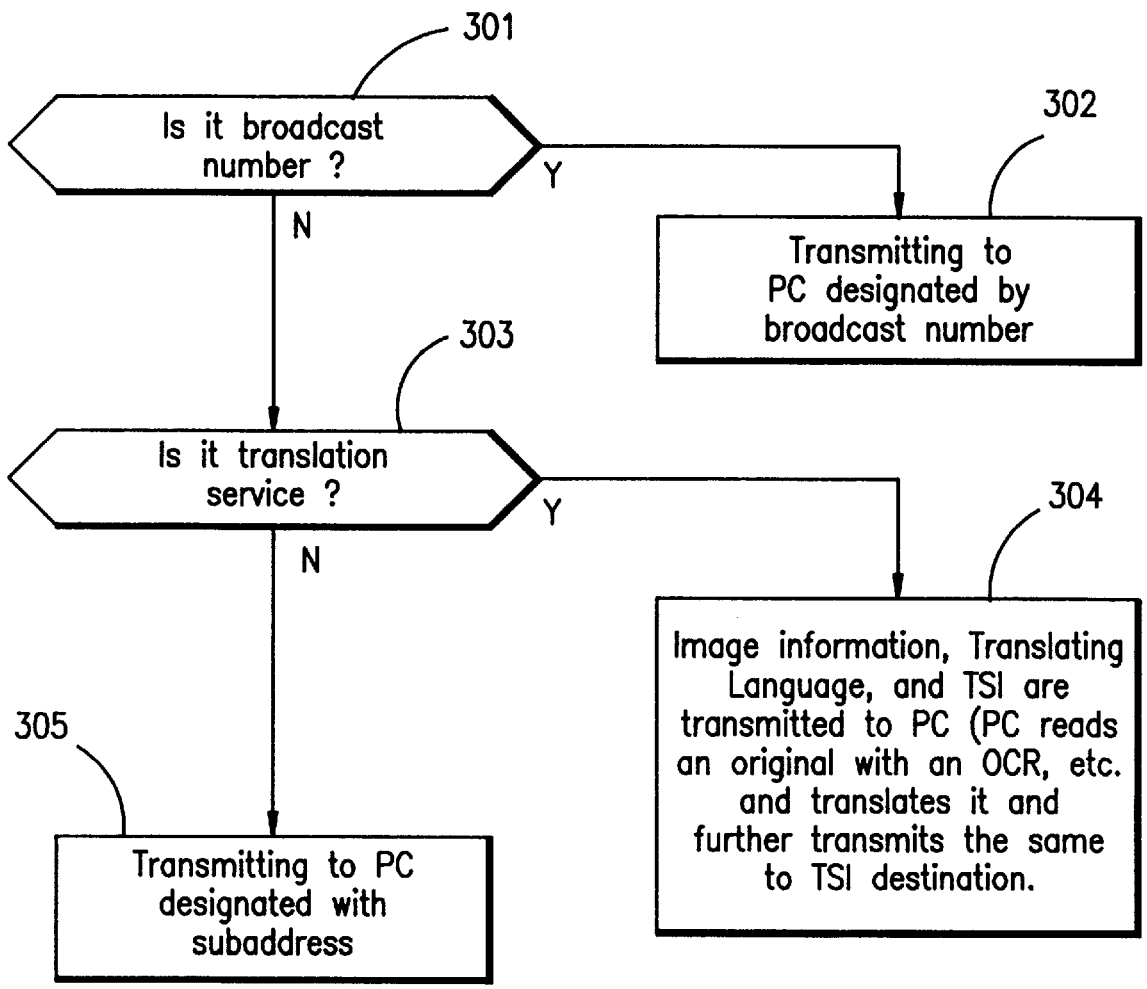
FIG. 9 is a flow chart showing what happens when the facsimile server 3 of FIG. 1 receives a call with a subaddress designation.

FIG. 9 is a flow chart which shows what happens when a facsimile server 3 receives a call with a subaddress designation. First, it is decided whether the subaddress is one designating a broadcast or not (Step 301). If it is a broadcast subaddress, transmissions are made to PCs 1~n at the broadcasting destination which have been registered in accordance with that subaddress beforehand (Step 302). When it is not a broadcast message, it is decided whether the subaddress is a translation service request or not (Step 303). If it is a translation service request, the image information from the sending facsimile terminal is transmitted to the pertinent FC (Step 304) for translation. The PC then translates the image by first reading the original with an OCR (optical character reader), etc. or directly translates the document if based on character transmitted information, and transmits the translation results to the number designated by the subaddress in the TSI. If it is not a translation service request, as decided in the Step 303, then the subaddress designates merely a transfer service request, thus the image information is transmitted to a PC designated by the subaddress (Step 305).

Since a subaddress notification is made together with the TSI information in the present invention, it is possible to realize a service using a subaddress without being limited by the type of equipment employed at a sending side, by supporting a subaddress receiving function within a TSI at the receiving side. Also, the subaddress within a TSI can be designated together with a number of a called party and convenience is enhanced. Also, a subaddress message can be used even with facsimile terminal equipment which only has a usual ten-key keyboard. If a facsimile adapter is added, even an existing conventional facsimile terminal can make a transmission with a subaddress added to the TSI, therefore a number of services can be realized. Also, even when a broadcast communication is made to plural terminals by a facsimile server of a transmission from an outside network, a broadcast to one or a plurality of facsimile terminals can be made with but one transmission of the image information. Further, a translation of an image into various languages can be designated by a subaddress designation from the outside. While the invention has been described with respect to a translation service as one of the services which can be designated with a subaddress, the invention may be used equally with other services which may manipulate or otherwise transform the image data which is transmitted to a receiving facsimile machine.

Although the invention has been described with reference to an exemplary embodiment it should be realized that many modifications can be made without departing from the spirit and scope of the invention. In particular, although the invention has been described as being carried out with facsimile terminals which employ a programmed CPU as a control system, it should be understood that many other techniques and structures for sending and/or receiving and acting on subaddress messages can be used, including hardwired circuits. Accordingly, the invention is not limited by the foregoing description, but is only limited by the scope of the appended claims.

We claim:

1. A method of facsimile communication comprising the steps of:

establishing a communication link between an image sending facsimile terminal and an image receiving facsimile terminal using a communication procedure having permitted transmission symbols and prohibited transmission symbols, said prohibited transmission symbols including "*" and "#";

sending, during said communication procedure, a sending terminal identification (TSI) message from said sending facsimile terminal to said receiving facsimile terminal;

adding a plurality of digits to said sending terminal identification message at said sending facsimile terminal to form a subaddress message, said subaddress message providing instructions to said image receiving facsimile terminal concerning how said image receiving facsimile terminal should handle an image received from said sending facsimile terminal;

separating said sending terminal identification TSI message from said subaddress message using at least one of the prohibited transmission symbols "#" and "*".

converting at said sending facsimile terminal at least one prohibited separation symbol to a permitted transmission symbol prior to transmission to said receiving facsimile terminal;

transmitting an image from said sending facsimile terminal to said image receiving facsimile terminal;

detecting said subaddress message at said receiving facsimile terminal; and processing an image received from said sending facsimile terminal at said image receiving facsimile terminal in accordance with the instructions contained in said subaddress message.

2. A method as in claim 1, wherein said subaddress message contains broadcast instructions and said receiving facsimile terminal processes said received image by broadcasting it to at least one other facsimile terminal.

3. A method as in claim 1, wherein said subaddress message contains image transformation instructions and said receiving facsimile terminal processes said received image by transforming it in accordance with said transformation instructions.

4. A method as in claim 3, wherein said transformation instructions include instructions to translate a received image from one language format to another and said receiving facsimile terminal processes said received image by translating it from one language format to another.

5. A method as in claim 3, wherein said transformation instructions include instructions to translate a received image from a graphic image format to a data text format and said receiving facsimile terminal performs said processing by translating said received image from said graphic image format to a data text format.

6. A method as in claim 2, wherein said receiving facsimile terminal is capable of selectively broadcasting said received image to one or more of a plurality of other facsimile terminal and wherein said broadcast message tells said receiving facsimile terminal which of said one or more of said plurality of other facsimile terminal said received image is to be broadcast to, and said receiving facsimile terminal processes said received image by broadcasting it in accordance with said subaddress message.

7. A method as in claim 1, wherein said subaddress message is prestored in said sending facsimile terminal and is retrieved from storage and transmitted to said receiving facsimile terminal during said communication procedure.

8. A method as in claim 1, wherein said subaddress message is entered by an operator at said sending facsimile terminal and transmitted to said receiving facsimile terminal during said communication procedure.

9. A method as in claim 7, wherein said stored subaddress message is rewritten at the time a number of a called receiving facsimile terminal is read out.

10. A method as in claim 7, wherein said stored subaddress message may be rewritten in a memory registration operation.

11. A method as in claim 1, wherein said sending facsimile terminal stores the numbers of one or more receiving facsimile terminal and stores said subaddress message in association with said stored numbers.

12. A method as in claim 2, wherein said receiving facsimile terminal transmits a sending terminal identification (TSI) and subaddress message to said one or more other facsimile terminals during said broadcasting operation.

13. A method of facsimile communication comprising the steps of:

initiating a facsimile communication at a sending facsimile terminal using a communication procedure having permitted transmission symbols and prohibited transmission symbols, said prohibited transmission symbols including "*" and "#";

separating a terminal identification TSI message from a subaddress message using at least one of the symbols "#" and "*", said subaddress message providing instructions to an image receiving facsimile terminal concerning how to process image information transmitted by said sending facsimile terminal;

converting at said sending facsimile terminal at least one prohibited separation symbol to a permitted transmission symbol prior to transmission;

transmitting from said sending facsimile terminal said sending terminal identification message TSI together with said subaddress message; and transmitting image information from said sending facsimile terminal.

14. A method of facsimile communication comprising the steps of:

receiving at an image receiving facsimile terminal a sending terminal identification message and a subaddress message using a communication procedure having permitted transmission symbols and prohibited transmission symbols, said prohibited transmission symbols including "*" and "#", said subaddress message providing instructions to said receiving facsimile terminal on how to process a facsimile image received from a sending facsimile terminal transmitting said terminal identification message;

detecting said subaddress message at said receiving facsimile terminal, said subaddress message being separated from said terminal identification message TSI with a permitted transmission symbol that has been converted from at least one of the prohibited symbols "#" and "*";

receiving said facsimile image at said receiving facsimile terminal; and processing said received facsimile image at said receiving facsimile terminal in accordance with said detected subaddress message.

15. A method as in claim 14, wherein said subaddress message contains broadcast instructions and said receiving facsimile terminal processes said received image by broadcasting it to at least one other facsimile terminal.

16. A method as in claim 14, wherein said subaddress message contains image transformation instructions and said receiving facsimile terminal processes said received image by transforming it in accordance with said transformation instructions.

17. A method as in claim 16, wherein said transformation instructions include instructions to translate a received image from one language format to another and said receiving facsimile terminal processes said received image by translating it from one language format to another.

18. A method as in claim 16, wherein said transformation instructions include instructions to translate a received image from a graphic image format to a data text format and said receiving facsimile terminal performs said processing by translating said received image from said graphic image format to a data text format.

19. A method as in claim 15, wherein said receiving facsimile terminal is capable of selectively broadcasting said received image to at least one of a plurality of other facsimile terminals and wherein said broadcast message tells said receiving facsimile terminal which of said one or more of said plurality of other facsimile terminals said received image is to be broadcast to, and said receiving facsimile terminal processes said received image by broadcasting it in accordance with said subaddress message.

20. A method as in claim 13, wherein said subaddress message is prestored in said first sending facsimile terminal and is retrieved from storage and transmitted to said receiving facsimile terminal during said communication procedure.

21. A method as in claim 13, wherein said subaddress message is entered by an operator at said sending facsimile terminal and transmitted to said receiving facsimile terminal during said communication procedure.

22. A method as in claim 20, wherein said stored subaddress message is rewritten at the time a number of a receiving facsimile terminal is called out.

23. A method as in claim 20, wherein said stored subaddress message is rewritten in a memory registration operation.

24. A method as in claim 13, wherein said sending facsimile terminal stores the numbers of one or more receiving facsimile terminals and stores said subaddress message in association with said stored numbers.

25. A method as in claim 15, wherein said receiving facsimile terminal transmits a sending terminal identification (TSI) and subaddress message to said at least one other facsimile terminal during said broadcasting operation.

26. A method of facsimile communication comprising the steps of:
  recognizing DTMF signals occurring during a transmission procedure from a sending facsimile terminal and storing the same;
  recognizing in said DTMF signals a request for a facsimile communication to a called party, which is to employ a subaddress;
  initiating a facsimile communication with said called party using at least part of said stored DTMF signal and a communication procedure having permitted transmission symbols and prohibited transmission symbols, said prohibited transmission symbols including "*" and "#"; and
  transmitting a sending terminal identification message to said called party together with a subaddress message added thereto when a request for a facsimile communication employing a subaddress is recognized, said subaddress message being separated from said sending terminal identification message with a permitted transmission symbol that has been converted from at least one of the prohibited symbols "#" and "*".

27. A method of facsimile communication as in claim 1, wherein said receiving facsimile terminal is a facsimile server which connects with a plurality of other facsimile terminals through an internal communication line, said method further comprising the steps of selecting at said sending facsimile terminal one or more of said other facsimile terminals for receiving said image through a subaddress message sent by said sending facsimile terminal, said facsimile server detecting said subaddress message and determining which of said other facsimile terminals is to receive said image and broadcasting a received facsimile image to the selected other facsimile terminals.

28. A method of facsimile communication as in claim 1, wherein a subaddress is designated at said sending facsimile terminal at the same time as when a call number of said receiving facsimile terminal is designated at said sending facsimile terminal.

29. A method of facsimile communication as in claim 1, wherein said sending facsimile terminal includes a sending facsimile machine which is incapable of sending a subaddress message, said subaddress message being added to said terminal identification message by an adapter connected to said sending facsimile machine.

30. A method of facsimile communication as in claim 27, wherein more than one of said other facsimile terminals are designated to receive a facsimile transmission in said subaddress message.

31. A method of facsimile communication as in claim 27, wherein said facsimile server has a memory storing subaddresses therein, each associated with one or more facsimile terminals to which a broadcast is to be made, said facsimile server consulting said memory upon receipt of a subaddress message to determine which facsimile terminals are to receive said transmitted image.

32. A method as in claim 4, wherein after said receiving facsimile terminal translates said received image it transmits the translated image back to said sending facsimile terminal.

33. A facsimile communication system comprising:
  a receiving facsimile terminal;
  a sending facsimile terminal comprising:
    means for sending, during a communication procedure with said receiving facsimile terminal having permitted transmission symbols and prohibited transmission symbols, said prohibited transmission symbols including "*" and "#", a sending terminal identification message which also includes a subaddress message, said subaddress message providing instructions to said receiving facsimile terminal concerning how it should handle an image received from said sending facsimile terminal, said subaddress message being separated from said sending terminal identification message with a permitted transmission symbol that has been converted from at least one of the prohibited symbols "#" and "*"; and means for transmitting an image to said receiving facsimile terminal;
  said receiving facsimile terminal comprising:
    means for detecting said subaddress message; and means for processing an image received from said sending facsimile terminal in accordance with the instructions contained in said subaddress message.

34. A system as in claim 33, wherein said subaddress message contains broadcast instructions and said receiving facsimile terminal processes said received image by broadcasting it to at least one other facsimile terminal.

35. A system as in claim 33, wherein said subaddress message contains image transformation instructions and said receiving facsimile terminal processes said received image by transforming it in accordance with said transformation instructions.

36. A system as in claim 35, wherein said transformation instructions include instructions to translate a received image from one language format to another and said receiving facsimile terminal processes said received image by translating it from one language format to another.

37. A system as in claim 35, wherein said transformation instructions include instructions to translate a received image from a graphic image format to a data text format and said receiving facsimile terminal performs said processing by translating said received image from said graphic image format to a data text format.

38. A system as in claim 34, wherein said receiving facsimile terminal is capable of selectively broadcasting said received image to one or more of a plurality of other facsimile terminals and wherein said broadcast message tells said receiving facsimile terminal which of said one or more of said plurality of other facsimile terminals said received image is to be broadcast to, and said receiving facsimile terminal processes said received image by broadcasting it in accordance with said subaddress message.

39. A system as in claim 33, wherein said subaddress message is prestored in said sending facsimile terminal and is retrieved from storage and transmitted to said receiving facsimile terminal during said communication procedure.

40. A system as in claim 33, wherein said subaddress message is entered by an operator at said sending facsimile terminal and transmitted to said receiving facsimile terminal during said communication procedure.

41. A system as in claim 39, wherein said stored subaddress message is rewritten at the time a number of a called receiving facsimile terminal is read out.

42. A system as in claim 39, wherein said stored subaddress message may be rewritten in a memory registration operation.

43. A system as in claim 33, wherein said sending facsimile terminal stores the numbers of one or more receiving facsimile terminals and stores said subaddress message in association with said stored numbers.

44. A system as in claim 34, wherein said receiving facsimile terminal transmits a sending terminal identification (TSI) and subaddress message to said one or more other facsimile terminals during said broadcasting operation.

45. A facsimile terminal comprising:
means operative during a communication procedure with another facsimile terminal for sending a terminal identification message TSI together with a subaddress message using a communication procedure having permitted transmission symbols and prohibited transmission symbols, said-prohibited transmission symbols including "*" and "#" said subaddress message containing instructions on how said other facsimile terminal should handle image information transmitted thereto, and said subaddress message being separated from said sending terminal identification message with a permitted transmission symbol that has been converted from at least one of the prohibited symbols "#" and "*"; and
means for transmitting image information to said other facsimile terminal.

46. A facsimile terminal as in claim 45, wherein said subaddress message contains broadcast instructions.

47. A facsimile terminal as in claim 45, wherein said subaddress message contains image transformation instructions.

48. A facsimile terminal as in claim 47, wherein said transformation instructions include instructions to translate a received image from one language format to another.

49. A facsimile terminal as in claim 47, wherein said transformation instructions include instructions to translate a received image from a graphic image format to a data text format.

50. A facsimile terminal as in claim 46, wherein said subaddress message tells a receiving facsimile terminal which of one or more of a plurality of other facsimile terminals an image is to be broadcast to.

51. A facsimile terminal as in claim 45, said subaddress message is prestored in a storage area.

52. A facsimile terminal as in claim 45, wherein said subaddress message is entered by an operator.

53. A facsimile terminal as in claim 52, wherein said stored subaddress message is rewritten at the time a number of a called receiving facsimile terminal is read out.

54. A facsimile terminal as in claim 52, wherein said stored subaddress message may be rewritten in a memory registration operation.

55. A facsimile terminal as in claim 45, wherein said sending facsimile terminal stores the numbers of one or more receiving facsimile terminals and stores subaddress messages in association with said stored numbers.

56. A facsimile terminal comprising:
means for receiving and detecting, a subaddress message sent from another facsimile terminal as part of a terminal identification message TSI using a communication procedure having permitted transmission symbols and prohibited transmission symbols, said prohibited transmission symbols including "*" and "#"; said subaddress message providing instructions on how to process a received facsimile image, and said subaddress message being separated from said sending terminal identification message with a permitted transmission symbol that has been converted from at least one of the prohibited symbols "#" and "*";
means for receiving a facsimile image; and
means for processing a received facsimile image in accordance with the instructions contained in said subaddress message.

57. A facsimile terminal as in claim 56, wherein said subaddress message contains broadcast instructions and said facsimile terminal processes said received image by broadcasting it to at least one other facsimile terminal.

58. A facsimile terminal as in claim 56, wherein said subaddress message contains image transformation instructions and said facsimile terminal processes said received image by transforming it in accordance with said transformation instructions.

59. A facsimile terminal as in claim 58, wherein said transformation instructions include instructions to translate a received image from one language format to another and said facsimile terminal processes said received image by translating it from one language format to another.

60. A facsimile terminal as in claim 58, wherein said transformation instructions include instructions to translate a received image from a graphic image format to a data text format and said facsimile terminal performs said processing by translating said received image from said graphic image format to a data text format.

61. A facsimile terminal as in claim 56, wherein said facsimile terminal is capable of selectively broadcasting said received image to at least one of a plurality of other facsimile terminals and wherein said broadcast message tells said facsimile terminal which of said one or more of said plurality of other facsimile terminals said received image is to be broadcast to, and said facsimile terminal processes said received image by broadcasting it in accordance with said subaddress message.

62. A facsimile terminal as in claim 61, wherein said facsimile terminal transmits a sending terminal identification (TSI) and a subaddress message to said at least one of said other facsimile terminals during said broadcasting operation.

63. A facsimile terminal adapter comprising:
means for receiving and storing DTMF signals generated by an existing facsimile terminal at the initiation of a facsimile communication using a communication procedure having permitted transmission symbols and prohibited transmission symbols, said prohibited transmission symbols including "*" and "#";
means for determining if said existing facsimile terminal is requesting a facsimile communication which is to employ a subaddress;
means for storing at least a portion of said stored DTMF signals and using at least a portion of the stored DTMF signal to initiate a communication with a called party; and
means for sending a terminal identification message to a called party together with a subaddress message added thereto when a request for a facsimile communication employing a subaddress is received, from said existing facsimile terminal, said subaddress message being separated from said sending terminal identification message with a permitted transmission symbol that has been converted from at least one of the prohibited symbols "#" and "*".

64. A facsimile terminal adapter as in claim 63, wherein said subaddress message contains broadcast instructions.

65. A facsimile terminal adapter as in claim 63, wherein said subaddress message contains image transformation instructions.

66. A facsimile terminal adapter as in claim 65, wherein said transformation instructions include instructions to translate a received image from one language format to another.

67. A facsimile terminal adapter as in claim 66, wherein said transformation instructions include instructions to translate a received image from a graphic image format to a data text format.

68. A facsimile terminal adapter as in claim 63, wherein said subaddress message tells a receiving facsimile terminal which of one or more of a plurality of other facsimile terminals an image is to be broadcast to.

69. A facsimile terminal adapter as in claim 63, said subaddress message is prestored in a storage area.

70. A facsimile terminal adapter as in claim 63, wherein said subaddress message is entered by an operator.

71. A facsimile terminal adapter as in claim 69, wherein said stored subaddress information is rewritten at the time a number of a called receiving facsimile terminal is read out.

72. A facsimile terminal adapter as in claim 69, wherein said stored subaddress information may be rewritten in a memory registration operation of one or more of said other facsimile terminals, said facsimile server detecting said subaddress message and broadcasting a received facsimile image to said one or more other facsimile terminals in accordance with said subaddress message.

73. A facsimile terminal as in claim 56, wherein said facsimile terminal comprises a facsimile server which is connected with a plurality of other facsimile terminals through an internal communication line, said subaddress message containing instructions to said facsimile server for selecting one or more of said other facsimile terminals for receiving a facsimile image, said facsimile server detecting said subaddress message and broadcasting a received facsimile image to said one or more other facsimile terminals in accordance with said subaddress message.

74. A facsimile terminal as in claim 73, wherein one or more of said facsimile terminals is designated to receive a facsimile transmission in said subaddress message.

75. A facsimile terminal as in claim 73, wherein said facsimile server has a memory storing subaddress therein, each associated with one or more facsimile terminals to which a broadcast is to be made, said facsimile server consulting said memory upon receipt of a subaddress message to determine which facsimile terminals are to receive said transmitted image, wherein said subaddress message contains broadcast instructions and said facsimile server broadcasts a received image to one or more of said plurality of other facsimile terminals in accordance with said subaddress message.

76. A facsimile terminal as in claim 73, wherein said subaddress message contains broadcast instructions and said facsimile server broadcasts a received image to one or more of said plurality of other facsimile terminals in accordance with said subaddress message.

77. A facsimile terminals as in claim 73, wherein said subaddress message contains image transformation instructions and said facsimile server forwards said received facsimile image to one or more of said other facsimile terminals for image transformation in accordance with said subaddress message.

78. A facsimile terminal as in claim 77, wherein said transformation instructions include instructions to translate a received image from one language format to another.

79. A facsimile terminal as in claim 77, wherein said transformation instructions include instructions to translate a received image from a graphic image format to a data text format.

* * * * *